Dec. 8, 1964   A. O. G. ERNST ETAL   3,159,969
SEALING AND ROTATABLE MOUNTING ARRANGEMENT FOR ROCKET NOZZLES
Filed March 18, 1963   4 Sheets-Sheet 1
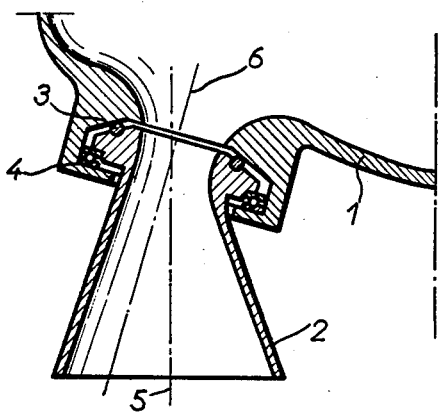
Fig.:1
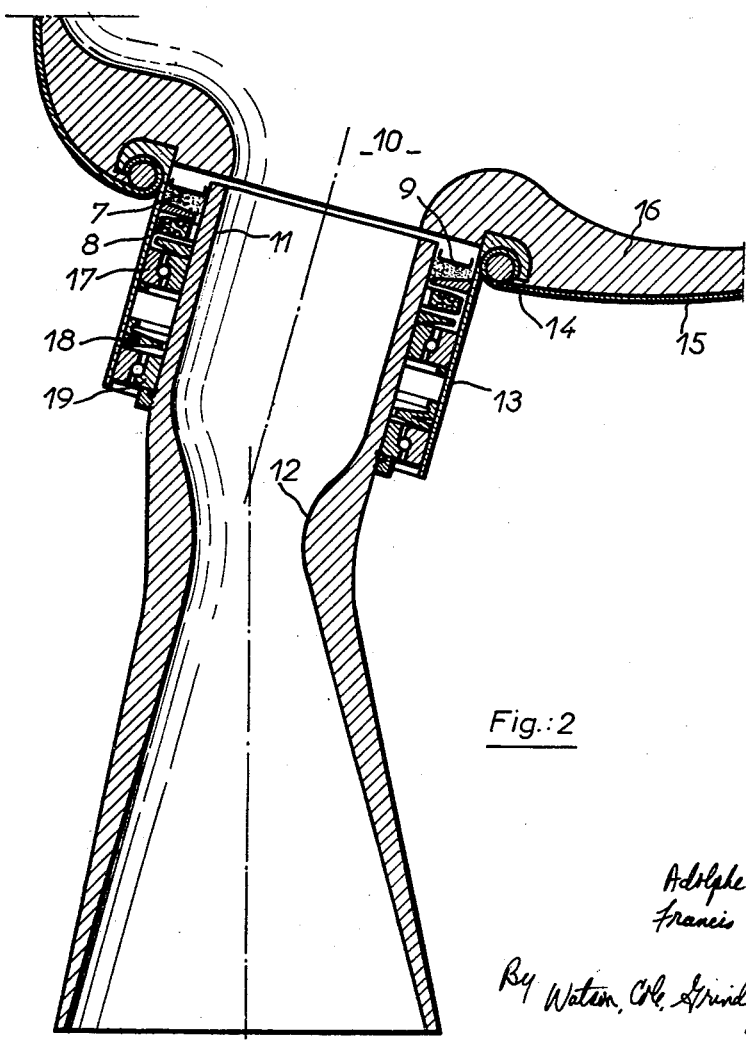
Fig.:2
INVENTORS
Adolphe O. G. Ernst
Francis J. M. G. Tremouille
By Watson, Cole, Grindle & Watson
ATTORNEYS Dec. 8, 1964   A. O. G. ERNST ETAL   3,159,969
SEALING AND ROTATABLE MOUNTING ARRANGEMENT FOR ROCKET NOZZLES
Filed March 18, 1963   4 Sheets-Sheet 2
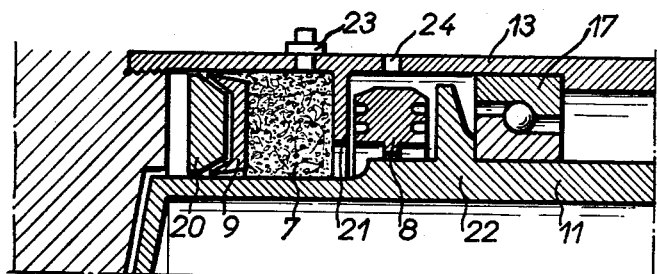
Fig.:3
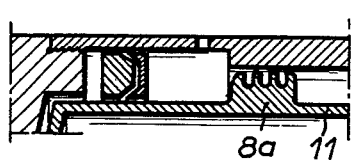
Fig.:4
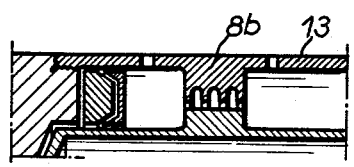
Fig.:4A
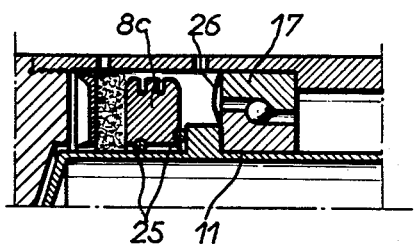
Fig.:5
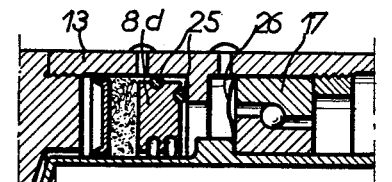
Fig.:5A
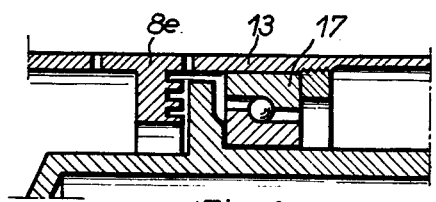
Fig.:6
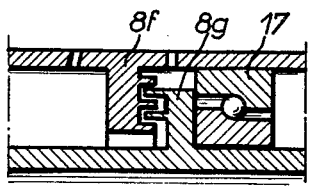
Fig.:7
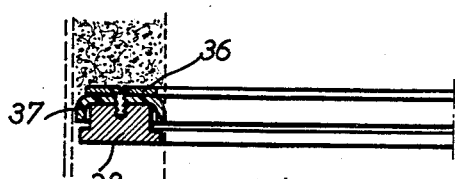
Fig.:14
INVENTORS
Adolphe O.G. Ernst
Francis J.M.H. Tremouilles
By Watson, Cole, Grindle & Watson
ATTORNEYS

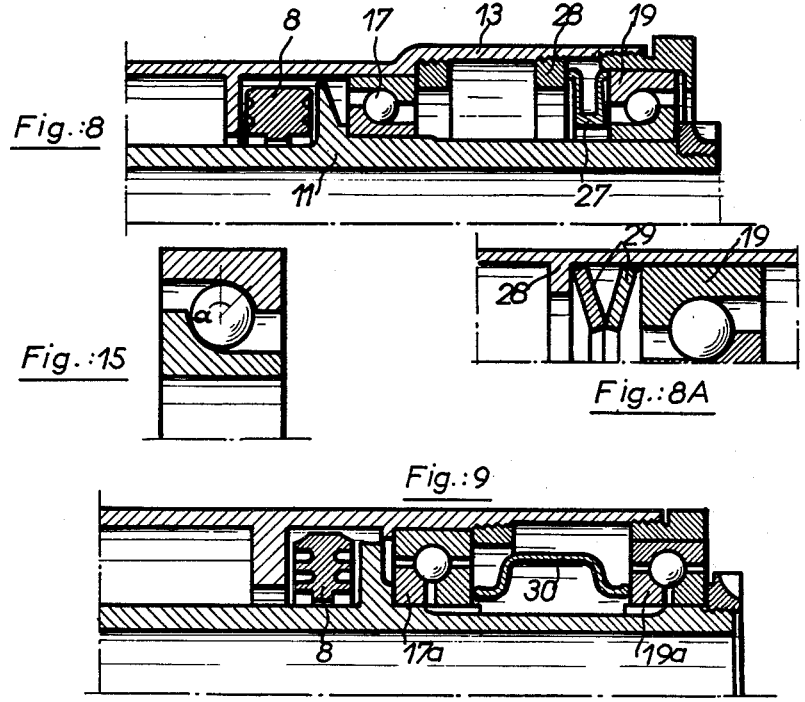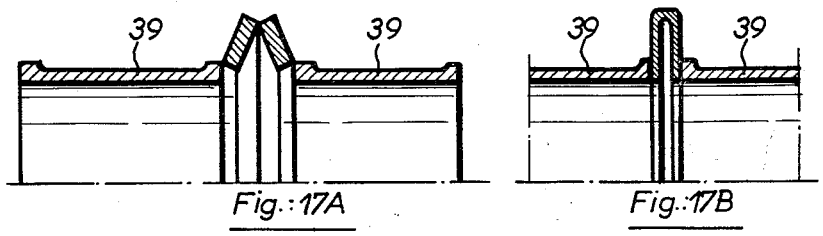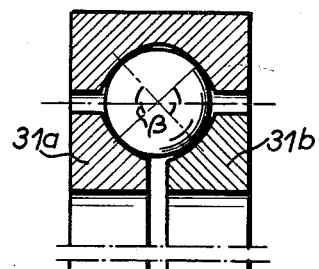

United States Patent Office 3,159,969
Patented Dec. 8, 1964

3,159,969
SEALING AND ROTATABLE MOUNTING
ARRANGEMENT FOR ROCKET NOZZLES
Adolphe Otton Gontier Ernst, Bois-le-Roi, and Francis
Jean-Marie Guy Tremouilles, Paris, France, assignors
to Societe Nationale d'Etude et de Construction de
Moteurs d'Aviation, Paris, France, a French company
Filed Mar. 18, 1963, Ser. No. 265,925
Claims priority, application France, Mar. 20, 1962,
891,683
14 Claims. (Cl. 60—35.55)

Devices which are propelled by rockets always have to be guided both when they follow a pre-determined path of travel and when it is desired to make them follow an arbitrarily varying course.

Among the various constructions which have been developed in order to make the thrust of a rocket orientable, it has been proposed that the discharge nozzles supplied with liquid propellants be mounted so as to be universally movable, and to make some nozzles orientable about an axis of rotation arranged obliquely with respect to their ejection or thrust axis.

The invention is concerned more particularly with elbowed convergent-divergent discharge nozzles which are orientable about an axis of rotation which coincides with the axis of symmetry of their upstream convergent portion. The axis of symmetry of their downstream divergent portion, or thrust axis, is therefore inclined with respect to the said axis of rotation.

The joint between the rocket end and the orientable discharge nozzle is situated upstream of the sonic throat or at the level of the said throat. It is important to arrange in this region a sealing arrangement which prevents leakages of hot gas under high pressure which would have the result of lowering efficiency and leading to rapid deterioration of the discharge nozzle. It is also important that this sealing arrangement and the arrangement for the rotatable mounting of the said discharge nozzle should introduce the minimum amount of friction into the orientation control means, which should be as light as possible and should require as little energy as possible.

The invention consists essentially in disposing between the fixed and mobile parts of an elbowed orientable discharge nozzle a sealing arrangement constituted by a supply of a sealing paste which is retained downstream by at least one packing of the labyrinth type and may if appropriate be separated upstream by means of a piston from the high-pressure hot gases. The sealing paste has a base of natural graphite flakes mixed in suitable proportions with grease which resists high pressures and high temperatures. Therefore, it is characterised both by its density and its lubricating power under high temperatures. The throttling of this paste through labyrinths enables the latter to be used as bearings.

The invention also consists in possibly combining at least one rolling contact bearing with such a sealing arrangement.

According to an advantageous form of embodiment, a main, oblique-contact ball bearing receiving the force acting on the discharge nozzle is arranged in the vicinity of the labyrinth packing, and a secondary bearing is used for the centering of the discharge nozzle and is provided with a means for taking up the play in the said main bearing. Other, modified forms of embodiment are possible.

Such sealing and rotatable mounting arrangements cause only a low frictional torque, which is moreover particularly constant in cases where the labyrinth packings also act as bearings.

The description which now follows with reference to the accompanying drawings, given by way of non-limitative example, will make it easy to understand how the various features of the invention are arranged and the manner in which they are put into effect, any feature brought out either from the text or from the drawings being understood to come within the scope of the present invention.

FIGURE 1 is a diagrammatic view, in section through its plane of symmetry, of a conventional orientable discharge nozzle.

FIGURE 2 shows in the same manner but on a larger scale an orientable discharge nozzle according to the present invention.

FIGURE 3 shows a detail of FIGURE 2 on a larger scale, illustrating one form of embodiment of the labyrinth, and FIGURES 4 to 7 show variants thereof.

FIGURE 8 is concerned with a rotatable mounting arrangement adapted to take up play, of which FIGURE 8A shows one variant and FIGURE 9 a different form of embodiment.

FIGURE 14 shows a detail of the piston bearing on the sealing paste, seen in radial sectional view. FIGURES 15 and 16 are similar views of details of two types of ball bearings, and FIGURES 17A and 17B show details of two types of elastic means for taking up play.

Figure 10:
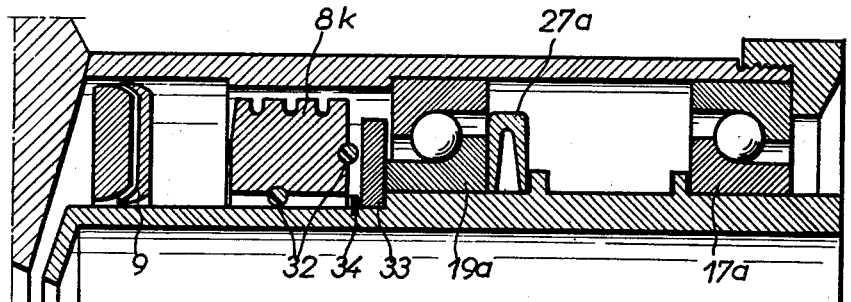
FIGURE 10 shows a form of embodiment which is the reverse of that of FIGURE 8, in the sense that it is the auxiliary bearing which is near the labyrinth.

With reference to FIGURE 1, this figure will be seen to show a conventional, orientable, elbowed discharge nozzle. The nozzle proper 2 is carried by the end 1 of the rocket and the axis of its divergent portion 5, or thrust axis, is oblique with respect to its rotational axis 6. The conventional arrangement for rotatable mounting and providing sealing-tightness is composed of a single ball bearing 4 and of a packing 3 of synthetic or plastic material, of toroidal form or of lipped form. The manipulating torque due essentially to the friction at the packing, is of a high value.

According to the invention, of which a basic diagrammatic example is given in FIGURE 2, the sealing arrangement is constituted by a chamber 7 containing a supply of sealing paste, a labyrinth packing 8 situated downstream of the said chamber, and a piston 9 closing the said chamber at the end subjected to the hot gases issuing from the combustion chamber 10 of the rocket, where the pressure may be of about 100 kg./cm.².

The portions thus enumerated, which constitute the sealing arrangement, have an annular form since they are arranged between the wall 11 of the upstream portion of the discharge nozzle preceding the sonic throat 12 and a cylindrical sleeve 13 fixed at 14 to the end 15 of the rocket which is covered with a protective layer 16.

The rotatable mounting arrangement is also situated between the wall 11 and the sleeve 13 and comprises, taken in order from the upstream to the downstream end: a main ball bearing 17; a means 18 for taking up play; and an auxiliary ball bearing 19.

When the rocket is in operation, the pressure of the combustion gases is exerted on the piston 9 and the sealing paste; the latter tends to pass through the labyrinth 8 and the loss of pressure due to the throttling of the paste opposes excessively rapid displacement of the piston 9. Therefore, the supply of sealing paste may be of small volume.

The following figures show many forms of embodiment of the invention.

FIGURE 3 shows a piston 9 having deformable lips which is protected by a lining 20 which is resistant to heat and is of low conductivity, for example being made of glass fibre or one of the materials known under the names of "Durestos" and "Teflon."

The chamber 7 containing the sealing paste having a base of natural graphite flakes and grease resistant to high pressure and high temperature is closed partly by a shoulder 21 carried by the sleeve 13. The latter cooperates with a shoulder 22 of the wall 11 of the discharge nozzle in order to hold in position a labyrinth 8 mounted freely between them.

Orifices 23 and 24 are used respectively for filling the chamber 7 with the sealing paste and for the slow and continuous evacuation of the said paste, the orifice 24 remaining normally open and the orifice 23 closed. The main bearing 17 receiving the force exerted by the gases on the discharge nozzle is of the type comprising one row of balls, with oblique contact.

FIGURES 4 to 7 show variants in the disposition of the labyrinth. It will be apparent that the operation of the rocket considerably heats the discharge nozzle and its accessories, and that constructional necessities relating to the bearing load and the relative expansions may entail minor modifications to the sealing arrangement, bearing in mind the small clearance of a labyrinth.

FIGURE 4 shows an axial-flow labyrinth 8a which is fast with the mobile part 11. FIGURE 4A shows the corresponding axial labyrinth 8b which is fast with the fixed part 13. FIGURES 5 and 5A represent two variants of FIGURES 4 and 4A according to which axial labyrinths 8c and 8d respectively are mounted freely on toroidal lining 25; elastic washers 26 also prevent the penetration of the sealing paste into the bearings 17. FIGURE 6 shows a fixed radial labyrinth and FIGURE 7 a double radial labyrinth 8f–8g.

The main bearing 17 is preferably arranged as near as possible to an axial or radial labyrinth. If the said bearing must be far from the labyrinth, the latter will advantageously be axial and a secondary, centering bearing with means for taking up play will be arranged near the said labyrinth.

FIGURES 8 and 10 show details of sealing and rotatable mounting arrangements according to the invention permitting the taking up of play in the bearings. In FIGURE 8, the main bearing 17 is near a freely mounted radial labyrinth. An auxiliary ball bearing 19 of the oblique-contact type, like the said main bearing, is arranged in the opposite direction to the latter and is held in bearing contact by a spring steel washer 27 of U-shaped cross-section. The latter bears on the auxiliary bearing 19 on the one hand and on a shoulder 28 of the fixed part 13 on the other hand which may be fitted on by screwing. FIGURE 8A shows a variant where the U-washer is replaced by two opposed conical washers 29 of the Belleville type. In FIGURE 9, the bearings 17a and 19a are directly connected by an elastic intermediate element 30 and are also of a particular type. In fact the simple, oblique-contact bearings mentioned at the beginning of the present description and one of which is shown on a larger scale in FIGURE 15, and which are characterised by a contact angle $\alpha$ in the vicinity of 60°, toroidal raceways and the possibility of radial relative expansion without jamming, can be replaced by the bearings shown in FIGURE 16. The inner ring of these latter bearings is in two parts 31a and 31b; the contact angles $\beta$ are equal and in the vicinity of 60°; the radii of curvature in a radial plane of the four raceways are equal and the two outer raceways are connected by a rounded portion. The radial relative expansion of the inner and outer rings 31a and 31b may reach 1 millimetre at least without any detrimental effect on the operation of such a bearing, owing to the possibility of displacement of the inner rings.

FIGURE 10 shows a variant of the invention according to which the main bearing 17a is situated opposite the piston 9. An auxiliary bearing 19a is then arranged near an axial-type labyrinth 8k which is advantageously of a floating type and is retained by toriodal lining 32. A U-section elastic washer 27a makes it possible to take up play in the bearings. A washer 33 positioned by a circlip 34 prevents the penetration of the sealing paste into the auxiliary bearing 19a. This arrangement of the parts permits of easy adjustment of the labyrinth clearance by replacing the latter.

Figure 11:
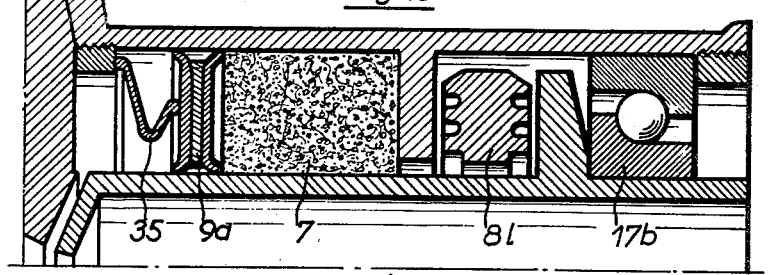
FIGURES 11 and 12 show two forms of embodiment wherein the play take-up static force is exerted by a spring acting on a piston which separates the hot gases from the sealing paste.
Figure 12:
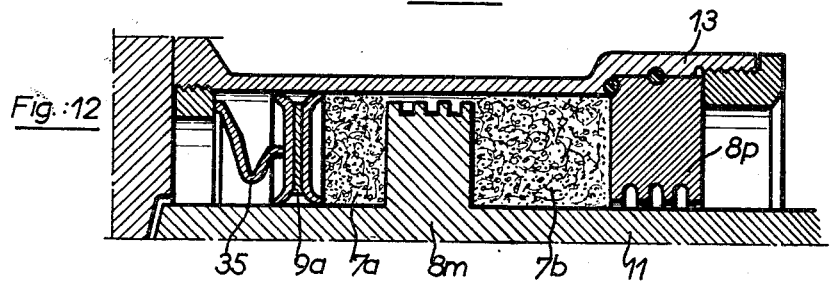

FIGURES 11 and 12 deal with two last variants of the invention which are characterised by the at least partial elimination of the bearings, the chamber where the sealing paste is contained and the labyrinths through which the said paste flows slowly during operation being used as a plain bearing, which greatly reduces the friction torque.

In the case of the arrangement shown in FIGURE 11, the piston 9a is of a special type since it is provided with an elastic bearing element: elastic spring or washer 35 which applies pressure to the sealing paste contained in the annular chamber 7 and ensures the taking up of play in the single bearing 17b. The sealing paste is of sufficient viscosity to ensure that it does not leak through the labyrinth before the rocket is ignited and there is a corresponding increase in the force acting on the piston 9a. The labyrinth 8l is arranged near the bearing 17b and may be of any desired type, radial in the case shown in the figure.

In the case of FIGURE 12 no ball bearing remains. The annular chamber receiving the sealing paste is divided into two parts 7a and 7b which are separated by an axial labyrinth 8m fast with the orientable part 11 of the discharge nozzle. A piston 9a which may be provided with an elastic pushing element 35 is arranged upstream of the chamber 7a and an axial labyrinth 8p fast with the fixed sleeve 13 downstream of the chamber 7b.

Before the rocket is ignited, the pressure of the piston 9a on the sealing paste, which is at most a few kg./cm.$^2$, and also the possible forces on the orientable part 11 of the nozzle, are not sufficient to cause a squeezing of the sealing paste through the labyrinths 8m and 8p. The axial position of the part 11 is therefore fixed.

During combustion, the pressure of the hot gases exerts a considerable force on the piston 9a and also on the part 11. The sealing paste compressed in the two chambers 7a and 7b is throttled in the labyrinth and its flow, although slight, causes a slight axial displacement of the discharge nozzle. However, this displacement does not constitute a serious disadvantage to the guiding of the rocket by means of orientable elbowed discharge nozzles.

Figure 13A:
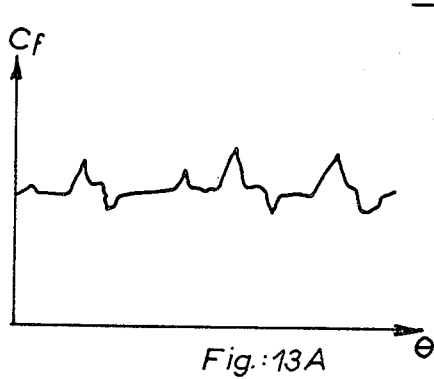
FIGURES 13A and 13B are diagrams representing the frictional torques, in dependence on the angles of rotation, of discharge nozzles according to the invention respectively equipped with rotatable mounting arrangements with and without rolling contact bearings.
Figure 13B:
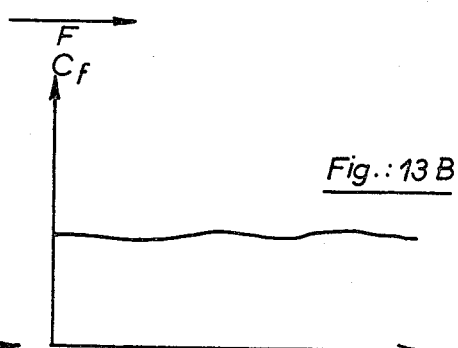

On the contrary, owing to the throttling of the sealing paste in labyrinths, the frictional torque Cf of the part 11 is very slight and has the advantage of being substantially constant, as may be seen from the diagram in FIGURE 13B, where the said torque is plotted as a function of the angle $\theta$ which is the rotating angle of the discharge nozzle. The same curve, corresponding to a variant comprising ball bearings, plotted in FIGURE 13A, shows the points due to the solid friction of the bearings.

FIGURES 14, 17A and 17B give some additional information on particular details of construction. FIGURE 14 shows in radial half-section an annular piston 9 composed of a metallic bearing washer 36, of a lipped lining 37 made of a deformable material such as synthetic rubber or polytetrafluorethylene, and of a lining 38 which resists heat. The latter may be assembled to the bearing washer 36 by screwing or rivetting and may be made of metal, glass fibre, a composite material having a basis of asbestos, polytetrafluorethylene, etc.

FIGURE 17A and FIGURE 17B show variants of the means 30 for taking up play of FIGURE 9, comprising non-deformable tubular intermediate elements 39 and an elastic element: Belleville washers in FIGURE 17A, and a U-washer in FIGURE 17B.

It will be apparent that the invention is not limited to the forms of embodiment explicitly described, but that it also covers forms of embodiment which may be obtained by the employment of equivalent technical means.

What we claim is:

1. In a rocket equipped with at least one discharge nozzle having an upstream portion which is rotatable about its axis with respect to the said rocket and a downstream portion forming an elbow with the said upstream portion, a sealing and rotatable mounting arrangement disposed about the said upstream portion and comprising an axial-displacement annular piston, at least one labyrinth packing situated downstream of the said piston, and an annular chamber formed between the said piston, the upstream portion of the discharge nozzle, the labyrinth packing and a fixed part of the rocket, the said annular chamber being filled with a lubricating paste.

2. A sealing and mounting arrangement according to claim 1, wherein the annular piston comprises deformable lips and a lining of insulating material arranged on its upstream face.

3. A sealing and mounting arrangement according to claim 1 including ball bearings.

4. A sealing and mounting arrangement according to claim 1, wherein said lubricating paste is a consistent grease charged with graphite flakes.

5. A sealing and mounting arrangement according to claim 1 including a ball bearing arranged immediately downstream of the labyrinth packing in order to reduce the movements due to relative expansion between the discharge nozzle and the fixed part of the rocket.

6. A sealing and mounting arrangement according to claim 1 including a ball bearing having oblique bearing surfaces and an angle of contact of 60°.

7. A sealing and mounting arrangement according to claim 1 including a ball bearing comprising a double inner ring each part of which has an oblique bearing surface.

8. A sealing and mounting arrangement according to claim 1 including two oblique-surface bearings and elastic means arranged between them.

9. A sealing and mounting arrangement according to claim 1 including main and auxiliary bearings having oblique bearing surfaces and elastic means arranged between said bearings in order to maintain the axial position of the main bearing, the auxiliary bearing having slight axial displacement.

10. A sealing and mounting arrangement according to claim 1, wherein a labyrinth having grooves and flanges staggered in an axial direction, which is the direction of the travel of the grease which flows through the said labyrinth, is arranged in the vicinity of the said auxilary bearing.

11. A sealing and mounting arrangement according to claim 1 including a ball bearing arranged immediately downstream of the labyrinth packing in order to reduce the movements due to relative expansion between the discharge nozzle and the fixed part of the rocket and wherein an annular piston arranged upstream of the labyrinth is urged downstream by elastic means bearing on a fixed part of the rocket, in such a manner that the grease situated in the annular chamber between the said piston and the said labyrinth is subjected to slight positive pressure, which is, however, small enough to prevent flow of the said grease.

12. A sealing and mounting arrangement according to claim 1, wherein two labyrinth packings having grooves and flanges staggered in an axial direction are respectively fast, the upstream labyrinth with the rotatable part of the discharge nozzle and the downstream labyrinth with a fixed part of the rocket, co-axial with the said rotatable part of the discharge nozzle and surrounding the latter, the said annular piston being also urged downstream by elastic means in such a manner that the grease situated in the annular chamber between the said piston and the upstream labyrinth at least is subjected to slight positive pressure which is, however, small enough to prevent flow of the said grease through the two labyrinths before the rocket is ignited.

13. A sealing and rotatable mounting arrangement according to claim 1, wherein a labyrinth packing is constituted by an independent ring having a series of sealing grooves and tight fit against a coaxial member by means of toroidal sealing joints located in a cylindrical and a flat surfaces of said ring.

14. A sealing and rotatable mounting arrangement according to claim 3 wherein an elastic washer is disposed against a front flat surface of a ball bearing to prevent the penetration of said paste into said bearing.

References Cited by the Examiner

UNITED STATES PATENTS 2,912,188 11/59 Singelmann et al.
2,986,877 6/61 Emmons et al. _____ 60—35.55

FOREIGN PATENTS 875,205 8/61 Great Britain.

SAMUEL LEVINE, *Primary Examiner.*